(12) United States Patent
Hoshino et al.

(10) Patent No.: US 12,244,164 B2
(45) Date of Patent: Mar. 4, 2025

(54) CHARGE/DISCHARGE CONTROL CIRCUIT AND BATTERY DEVICE PROVIDED WITH SAME

(71) Applicant: ABLIC Inc., Tokyo (JP)

(72) Inventors: Sho Hoshino, Tokyo (JP); Takashi Ono, Tokyo (JP); Yasuhiro Kamijima, Tokyo (JP)

(73) Assignee: ABLIC Inc., Tokyo (JP)

( * ) Notice: Subject to any disclaimer, the term of this patent is extended or adjusted under 35 U.S.C. 154(b) by 379 days.

(21) Appl. No.: 17/392,860

(22) Filed: Aug. 3, 2021

(65) Prior Publication Data
US 2022/0045533 A1 Feb. 10, 2022

(30) Foreign Application Priority Data
Aug. 7, 2020 (JP) ................ 2020-134412

(51) Int. Cl.
*H02J 7/00* (2006.01)
(52) U.S. Cl.
CPC ...... *H02J 7/00302* (2020.01); *H02J 7/00306* (2020.01); *H02J 7/0048* (2020.01); *H02J 7/00712* (2020.01)

(58) Field of Classification Search
CPC ........................... H02J 7/007–007194
See application file for complete search history.

(56) References Cited

U.S. PATENT DOCUMENTS

| | | | |
|---|---|---|---|
| 2005/0127879 A1* | 6/2005 | Sato | H02J 7/007182 320/134 |
| 2015/0162763 A1* | 6/2015 | Kimura | H02J 7/0031 320/134 |
| 2019/0296581 A1 | 9/2019 | Onishi | |

FOREIGN PATENT DOCUMENTS

| | | | | |
|---|---|---|---|---|
| GB | 2175759 A | * | 12/1986 | ............ H02J 7/0073 |
| JP | 2008-312442 A | | 12/2008 | |
| JP | 2012-257407 A | | 12/2012 | |
| JP | 2019-170063 A | | 10/2019 | |

* cited by examiner

*Primary Examiner* — David V Henze-Gongola
(74) *Attorney, Agent, or Firm* — Crowell & Moring LLP

(57) ABSTRACT

Provided is a charge/discharge control circuit controllable by a control signal from a controller that is external. The charge/discharge control circuit includes a control circuit configured to, in response to a power-down control signal for transitioning to a power-down state being input from the controller, latch the power-down control signal and block a discharge path from a secondary cell (SC) to the controller.

3 Claims, 4 Drawing Sheets

CHARGE/DISCHARGE CONTROL CIRCUIT AND BATTERY DEVICE PROVIDED WITH SAME

RELATED APPLICATIONS

This application claims priority to Japanese Patent Application No. 2020-134412, filed on Aug. 7, 2020, the entire content of which is incorporated herein by reference.

BACKGROUND OF THE INVENTION

1. Field of the Invention

The present invention relates to a charge/discharge control circuit and a battery device provided with the same.

2. Description of the Related Art

In general, a battery device includes a charge/discharge control circuit configured to detect, for example, over-discharge and overcharge, and control the charge and discharge of a secondary cell to protect the secondary cell. This charge/discharge control circuit blocks a discharge path from the secondary cell to the load in response to detection of over-discharge, and blocks a charge path from a charger to the secondary cell in response to detection of overcharge.

Among such charge/discharge control circuits, there are circuits that have a power-down function configured to reduce current consumption inside the circuit, thereby ensuring that the secondary cell does not discharge until the product to which the battery device is connected is operated after shipment (refer to, for example, Japanese Patent Application Laid-open No. 2012-257407). Furthermore, there are circuits in which a controller is connected to such a charge/discharge control circuit such that the charge/discharge control circuit is externally caused to transition from a "normal state" in which charge and discharge are possible to a "power-down state" in which an internal circuit and the like are stopped to reduce the current consumption.

FIG. 4 is a block diagram of a battery device in the related art including a charge/discharge control circuit and a controller.

A battery device 50 in the related art includes a secondary cell SC, a charge/discharge control circuit 51 connected to the secondary cell SC, a discharge control field-effect transistor (PET) 52, a charge control PET 53, a controller 54 that can output a signal for transitioning to the power-down state to the charge/discharge control circuit 51, resistors 55, 56, a capacitor 57, an external positive electrode terminal EB+, and an external negative electrode terminal EB−. A load LD is connected between the external positive electrode terminal EB+ and the external negative electrode terminal EB−.

The controller 54 uses the secondary cell SC as a power source and, in a case in which the controller 54 outputs the signal for transitioning to the power-down state to the charge/discharge control circuit 51, the discharge control PET 52 is turned off via a control circuit 512, in other words, the controller 54 itself blocks the discharge path from the secondary cell SC.

The charge/discharge control circuit 51 includes a charge/discharge monitoring circuit 511, the control circuit 512, a detector 513, switches 514, 515, a positive electrode power source terminal VDD, a negative electrode power source terminal VSS, a discharge control terminal DO, a charge control terminal CO, an external negative voltage input terminal VM, and a control signal input terminal CTL.

Each circuit and each terminal are connected as in FIG. 4.

In the battery device 50, in response to the controller 54 outputting a power-down control signal for transitioning to the power-down state to the control signal input terminal CTL, the detector 513 detects the power-down control signal, and the control circuit 512 turns off the discharge control PET 52 via the discharge control terminal DO. Then, the discharge path from the secondary cell SC to the load LD and the controller 54 is blocked, and the external negative voltage input terminal VM is pulled up through the load LD and the resistor 56, and a voltage of the external negative voltage input terminal VM rises to near the voltage of the external positive electrode terminal EB+, that is, the positive electrode terminal of the secondary cell SC. The charge/discharge monitoring circuit 511, upon detection that the voltage exceeds a predetermined voltage for determining that the external negative voltage input terminal VM is pulled up (hereinafter referred to as a "power-down threshold voltage"), outputs a pull-up signal to the control circuit 512. The control circuit 512 into which the pull-up signal is input turns off the switches 514, 515 to block the discharge path from the secondary cell SC to the charge/discharge monitoring circuit 511 and the discharge path from the secondary cell SC to the detector 513.

Thus, in response to the controller 54 outputting the power-down control signal to the control signal input terminal CTL, the battery device 50 in the related art can block the discharge paths to the load LD, the controller 54, the charge/discharge monitoring circuit 511, and the detector 513 to transition to the power-down state in which current consumption is reduced.

Nevertheless, in the battery device 50 illustrated in FIG. 4, unintended operation such as the following may occur.

In a case in which the controller 54 outputs a power-down control signal to the control signal input terminal CTL to turn off the discharge control FET 52, the discharge path not only to the load LD but also to the controller 54 is blocked. At this time, since the negative electrode terminal of the controller 54 is connected to the external negative electrode terminal EB−, the negative electrode terminal of the controller 54 is pulled up to the potential of the positive electrode terminal of the secondary cell SC through the load LD. In turn, the controller 54 can no longer secure its own power source sufficiently and, in a case in which the voltage becomes less than or equal to the minimum operating voltage, operation becomes unstable, possibly causing the controller 54 to erroneously output a normal control signal for transitioning to the normal state. In particular, in a case in which the capacity of the load LD connected in parallel with the controller 54 is large, the discharge time of that capacity is long. As a result, the controller 54 may remain at or below the minimum operating voltage for a longer time, thereby lengthening the time of unstable operation. Then, in the battery device 50 that unintentionally transitions to the normal state, the secondary cell may be discharged until the product is first operated after shipment.

An aspect of the present invention is to provide a charge/discharge control circuit that, in the case of transitioning to a power-down state by a control signal from an external controller that uses a secondary cell as a power source, can reliably transition to the power-down state.

SUMMARY OF THE INVENTION

A charge/discharge control circuit of an embodiment of the present invention is a charge/discharge control circuit controllable by a control signal from a controller that is external.

The charge/discharge control circuit includes a control circuit configured to, in response to a power-down control signal for transitioning to a power-down state being input from the controller, latch the power-down control signal and block a discharge path from a secondary cell to the controller.

According to an aspect of the present invention, it is possible to provide the charge/discharge control circuit that, in the case of transitioning to the power-down state by the control signal from an external controller that uses the secondary cell as a power source, can reliably transition to the power-down state.

DETAILED DESCRIPTION OF THE PREFERRED EMBODIMENTS

Embodiments of the present invention will be described below with reference to the drawings.

Figure 1:
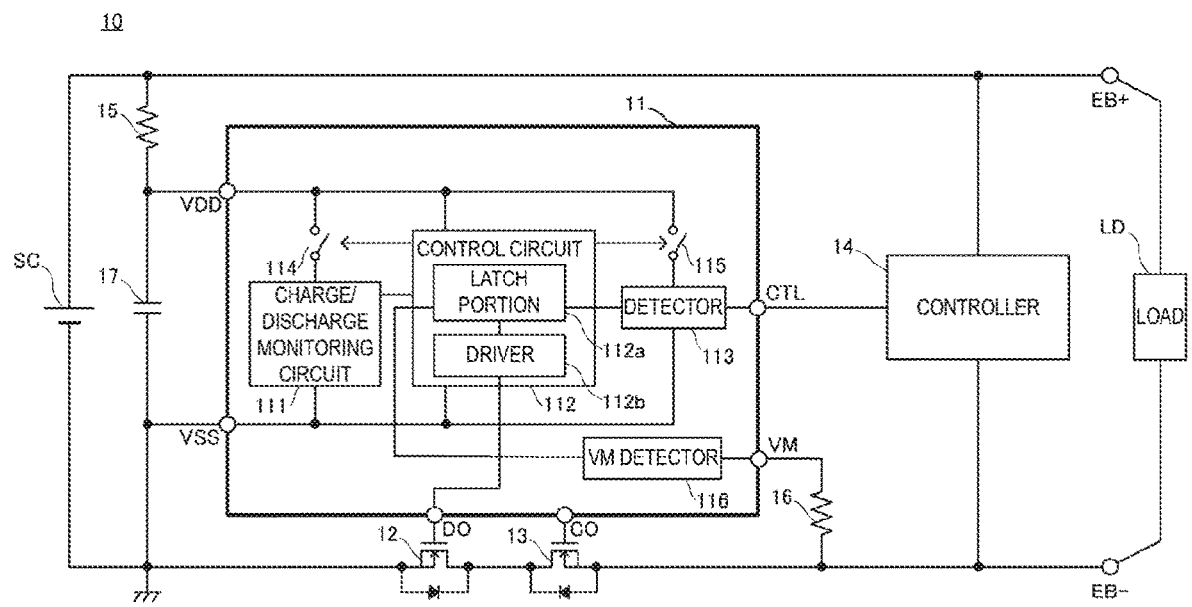
FIG. 1 is a block diagram illustrating a battery device of an embodiment of the present invention.

FIG. 1 is a block diagram illustrating a battery device of an embodiment of the present invention.

A battery device 10 of the present embodiment includes a secondary cell SC, a charge/discharge control circuit 11 connected to the secondary cell SC, a discharge control field-effect transistor (FET) 12, a charge control FET 13, a controller 14 that can output a control signal, resistors 15, 16, a capacitor 17, an external positive electrode terminal EB+, and an external negative electrode terminal EB−. A load LD for operating a product to which the battery device 10 is connected is connected between the external positive electrode terminal EB+ and the external negative electrode terminal EB−. Further, the charge/discharge control circuit 11 and the controller 14 operate using the secondary cell SC as a power source, similarly to the load LD.

Note that, in a case in which the secondary cell SC is to be charged, a charger is connected between the external positive electrode terminal EB+ and the external negative electrode terminal EB− instead of the load LD or in parallel with the load LD.

The charge/discharge control circuit 11 includes a charge/discharge monitoring circuit 111, a control circuit 112, a detector 113, switches 114, 115, a VM detector 116, a positive electrode power source terminal VDD, a negative electrode power source terminal VSS, a discharge control terminal DO, a charge control terminal CO, an external negative voltage input terminal VM, and a control signal input terminal CTL.

The positive electrode power source terminal VDD is connected to a positive electrode of the secondary cell SC and the external positive electrode terminal EB+ with the resistor 15 for suppressing the occurrence of electrostatic breakdown and power source fluctuation interposed therebetween. The negative electrode power source terminal VSS is connected to a negative electrode of the secondary cell SC and a ground potential.

The charge/discharge monitoring circuit 111, the control circuit 112, and the detector 113 are connected in parallel between the positive electrode power source terminal VDD and the negative electrode power source terminal VSS. To operate the charge/discharge monitoring circuit 111, the control circuit 112, and the detector 113, a VDD-VSS voltage is applied thereto. Among these, for the charge/discharge monitoring circuit 111 and the detector 113, the VDD-VSS voltage is applied thereto via the switches 114, 115, which are on-off controllable by the control circuit 112. These switches 114, 115 are switched from on to off in the case of transitioning from a normal state to a power-down state, and from off to on in the case of transitioning from the power-down state to the normal state.

Herein, in the battery device 10, the "normal state" refers to a state in which the secondary cell SC can be charged and discharged, and the charge/discharge monitoring circuit 111, the control circuit 112, the detector 113, and the VM detector 116 are running. The "power-down state" refers to a state in which the discharge path of the secondary cell SC is blocked, and operation of the charge/discharge monitoring circuit 111 and the detector 113 is stopped by the switches 114, 115, and thus, current consumption is reduced.

Note that the capacitor 17 is connected to the positive electrode power source terminal VDD at one end and to the negative electrode power source terminal VSS at the other end in order to suppress VDD-VSS voltage fluctuation.

The charge/discharge monitoring circuit 111 detects overcharge of the secondary cell SC and outputs an overcharge detection signal to the control circuit 112. The charge/discharge monitoring circuit 111 also detects over-discharge of the secondary cell SC and outputs an over-discharge detection signal to the control circuit 112.

The control signal input terminal CTL is a terminal into which the power-down control signal from the controller 14 is input and is connected to the detector 113.

The detector 113 outputs the power-down control signal input from the controller 14 to a latch portion 112a. In a case in which the detector 113 is a Schmitt trigger-type buffer, for example, the detector 113 can more reliably output the power-down control signal to the latch portion 112a, even if a voltage level of the input power-down control signal fluctuates due to noise or the like.

The external negative voltage input terminal VM is a terminal for detecting the voltage of the external negative electrode terminal EB− and is connected to the external negative electrode terminal EB− with a resistor 16 interposed therebetween. The resistor 16 is for suppressing the occurrence of electrostatic breakdown and damage in the case of the charger being connected in reverse.

The VM detector 116 detects the voltage of the external negative voltage input terminal VM by using a predetermined voltage value (also referred to as a "power-down detection threshold value") as reference, thereby detecting whether or not the external negative voltage input terminal VM has been pulled up. Upon detection that the external negative voltage input terminal MM has been pulled up, the VM detector 116 outputs a pull-up signal (an L-level non-reset signal in this embodiment) to the latch portion 112a of the control circuit 112. Further, upon detection that by the charger connected to the external negative voltage input terminal VM, the external negative voltage input terminal VM is at or below another predetermined voltage value (also referred to as a "power-down release threshold value") and has not been pulled up, the MM detector 116 outputs a pull-up release signal (an H-level reset signal in this embodiment) to the latch portion 112a of the control circuit 112. In a case in which the VM detector 116 is, for example, a Schmitt trigger-type buffer, similarly to the detector 113, even if a voltage level of the input pull-up signal or pull-up release signal fluctuates due to noise or the like, the signal can be output to the latch portion 112a.

In this way, the signals output from the charge/discharge monitoring circuit 111, the detector 113, and the VM detector 116 are input to the control circuit 112.

The control circuit 112, in response to an overcharge detection signal being input from the charge/discharge monitoring circuit 111, outputs a charge inhibit signal for turning off the charge control FET 13 to inhibit charging to the charge control terminal CO. Further, to permit charging of the secondary cell SC, the control circuit 112 outputs a charge permit signal for turning on the charge control FET 13 to permit charging to the charge control terminal CO.

The control circuit 112, in response to an over-discharge detection signal being input from the charge/discharge monitoring circuit 111, outputs a discharge inhibit signal for turning off the discharge control FET 12 to inhibit discharging to the discharge control terminal DO. Further, to permit discharging of the secondary cell SC, the control circuit 112 outputs a discharge permit signal for turning on the discharge control FET 12 to permit discharging to the discharge control terminal DO.

In this way, the control circuit 112 can control the charging and discharging of the secondary cell SC by using the discharge control FET 12 and the charge control FET 13 on the basis of the signal from the charge/discharge monitoring circuit 111.

This control circuit 112 includes the latch portion 112a and a driver 112b so that, after the power-down control signal is input from the detector 113, transition can be made to the power-down state even if a signal other than the power-down control signal is input due to malfunction of the controller 14 being at the minimum operating voltage or less.

The latch portion 112a, in response to a power-down control signal being input from the detector 113, latches the power-down control signal. Thus, even if a signal other than the power-down control signal is input, via the detector 113, to the latch portion 112a from the controller 14 that malfunctioned during transition to the power-down state, the control circuit 112 can more reliably transition to the power-down state without receiving the signal.

In particular, in a case in which the capacity of the load LD connected in parallel with the controller 14 is large, the discharge time to the controller 14 after the discharge path of the secondary cell SC is blocked is long, and thus the controller 14 may remain at or below the minimum operating voltage for a longer time, thereby lengthening the time of unstable operation. Even in such a case, the control circuit 112 can more reliably transition to the power-down state.

Further, the latch portion 112a latches the power-down control signal and outputs a latch signal corresponding to the power-down control signal to the driver 112b.

The driver 112b turns the discharge control terminal DO and the charge control terminal CO on and off, individually, in response to the latch signal input from the latch portion 112a. The driver 112b, in response to a latch signal corresponding to the power-down control signal being input from the latch portion 112a, outputs a discharge inhibit signal for turning off the discharge control FET 12.

In response to the discharge control FET 12 being turned off and the discharge path being blocked, the latch portion 112a receives a pull-up signal from the VM detector 116 that determined that the external negative voltage input terminal VM has been pulled up. Then, the control circuit 112 outputs a switch off signal for turning off the switches 114, 115 to each of the switches 114, 115. Thus, the charge/discharge control circuit 11 can transition to the power-down state that reduces the current consumption of the charge/discharge monitoring circuit 111 and the detector 113.

In the battery device 10 that transitions to the power-down state, in a case in which the charger is connected, the VM detector 116, which determined that the external negative voltage input terminal VM has not been pulled up, outputs a pull-up release signal to the latch portion 112a, making it possible to transition from the power-down state to the normal state in which charging and discharging are possible.

The discharge control FET 12 is connected to the charge control FET 13 on one end and is connected to the negative electrode of the secondary cell SC on the other end. The discharge control FET 12 is connected to the discharge control terminal DO at a gate thereof, and is on/off controlled by a discharge control signal output from the driver 112b. There are two types of discharge control signals, namely, the discharge inhibit signal and the discharge permit signal.

The charge control FET 13 is connected to the external negative electrode terminal EB− on one end and is connected to one end of the discharge control FET 12 on the other end. The charge control FET 13 is connected to the charge control terminal CO at a gate thereof, and is on/off controlled by a charge control signal output from the driver 112b. There are two types of charge control signals, namely, the charge inhibit signal and the charge permit signal.

The controller 14 can output the power-down control signal and the normal control signal. In this embodiment, in response to the controller 14 outputting the power-down control signal to the charge/discharge control circuit 11, the discharge path from the secondary cell SC is blocked by the charge/discharge control circuit 11, and thus the external negative voltage input terminal VM is pulled up. Thus, the controller 14 can no longer secure its own power source sufficiently and, in a case of the operation becoming undefined after the voltage drops to or below the minimum operating voltage, the controller 14 may output the normal control signal due to malfunction.

Figure 2:
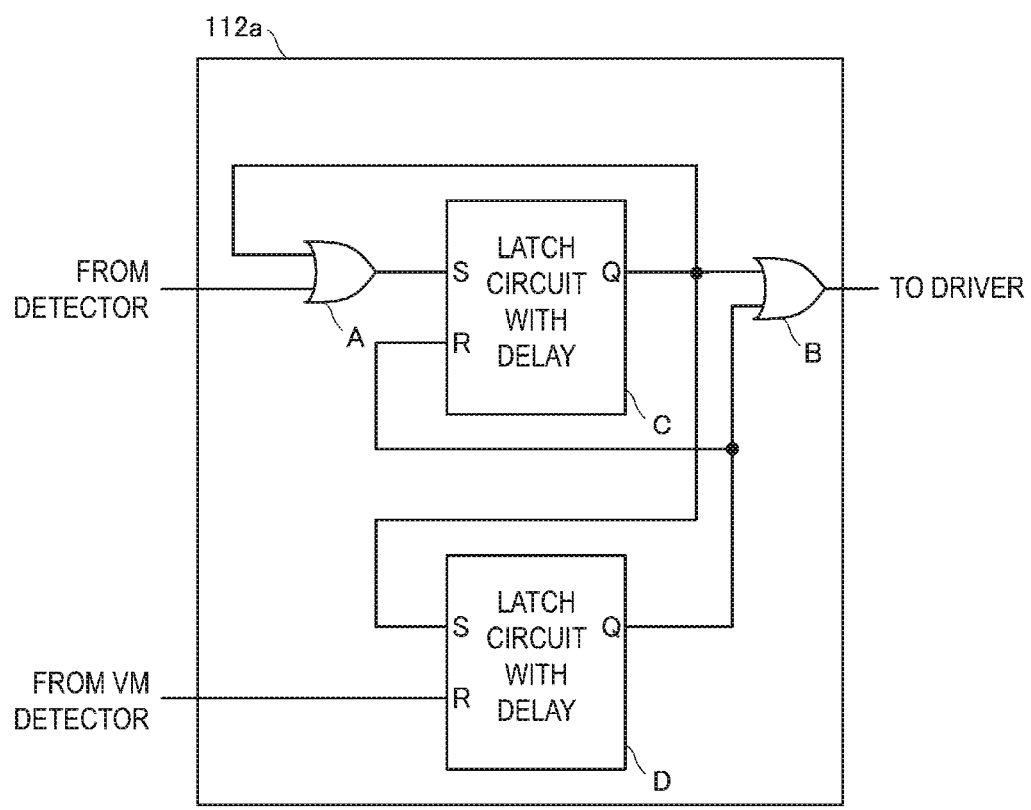
FIG. 2 is a block diagram illustrating a latch portion of the embodiment.

FIG. 2 is a block diagram illustrating the latch portion of the present embodiment.

The latch portion 112a includes two OR gates A, B and two SR latch circuits C, D. The two SR latch circuits C, D each include a delay circuit, and therefore each circuit may also be referred to as latch circuit with a delay.

An output terminal of the detector 113 illustrated in FIG. 1 and a Q terminal of the SR latch circuit C are respectively connected to input terminals of the OR gate A. An output terminal of the OR gate A is connected to an S terminal of the SR latch circuit C.

In the SR latch circuit C, an R terminal is connected to a Q terminal of the SR latch circuit D and, as described above, the S terminal is connected to the output terminal of the OR gate A. The Q terminal of the SR latch circuit C is connected to the input terminal of the OR gate A, an input terminal of the OR gate B, and an S terminal of the SR latch circuit D.

In the SR latch circuit D, an R terminal is connected to an output terminal of the VM detector 116 illustrated in FIG. 1 and, as described above, the S terminal is connected to the Q terminal of the SR latch circuit C. The Q terminal of the SR latch circuit D is connected to an input terminal of the OR gate B and, as described above, is also connected to the R terminal of the SR latch circuit C.

The Q terminal of the SR latch circuit C and the Q terminal of the SR latch circuit D are respectively connected to the input terminals of the OR gate B, as described above. The output terminal of the OR gate B is connected to an input terminal of the driver 112b illustrated in FIG. 1.

Next, operation of the battery device 10 in the transition from the normal state to the power-down state will be described with reference to FIG. 1 and FIG. 2.

Here, description will be made of an operation in which, in a state in which the load LD is connected between the external positive electrode terminal EB+ and the external negative electrode terminal EB−, a power-down control signal is output from the controller 14 to change the battery device 10 from the normal state to the power-down state at the time of product shipment.

Note that the secondary cell SC is charged to a voltage that does not exceed the overcharge voltage, and both the discharge control FET 12 and the charge control FET 13 are turned on.

The charge/discharge control circuit 11 receives a power-down control signal, output from the controller 14 to the control signal input terminal CTL, at the control circuit 112 via the detector 113. The control circuit 112 latches the power-down control signal by the latch portion 112a and outputs a latch signal corresponding to the power-down control signal to the driver 112b. The driver 112b turns off the discharge control FET 12 via the discharge control terminal DO in response to the latch signal.

Next, the operation of the latch portion 112a at this time will be described in detail with reference to FIG. 2.

The SR latch circuit C of the latch portion 112a, in response to receiving the power-down control signal from the detector 113 illustrated in FIG. 1 at the S terminal via the OR gate A, returns the signal to the input terminal of the OR gate A, and latches the signal. Furthermore, the SR latch circuit C outputs a signal (H level) for turning off the discharge control FET 12 via the OR gate B to the driver 112b and to the S terminal of the SR latch circuit D.

The SR latch circuit D receives the signal (H level) from the SR latch circuit C at the S terminal and receives a pull-up signal (L-level non-reset signal) from the VM detector 116 illustrated in FIG. 1. Then, the SR latch circuit D outputs a set signal (H level). This set signal is a signal (H level) that continues to turn off the discharge control FET 12 and is output to the driver 112b via the OR gate B and is also input to the R terminal of the SR latch circuit C. Thus, the Q terminal of the SR latch circuit C is reset (L level).

Returning to FIG. 1, with the discharge control FET 12 being turned off, the discharge paths from the secondary cell SC to the load LD and the controller 14 are blocked. At this time, in a case in which the voltage of the external negative voltage input terminal VM rises to near the voltage of the positive electrode terminal of the secondary cell SC, the voltage applied to the controller 14 may drop to or below the minimum operating voltage, causing the operation to become undefined and the normal control signal to be output after output of the power-down control signal. In particular, in a case in which the capacity of the load LD is large, the discharge time to the controller 14 after the discharge path of the secondary cell SC is blocked is long, and thus the controller 14 may remain at or below the minimum operating voltage for a longer time, thereby lengthening the time of unstable operation. Even in such a case, since the power-down control signal is latched by the latch portion 112a, the battery device 10 of this embodiment can more reliably transition to the power-down state.

Further, in response to the discharge path from the secondary cell SC being blocked, the external negative voltage input terminal VM is pulled up through the load LD and the resistor 16 to near the voltage of the positive electrode terminal of the secondary cell SC. Upon detection that the voltage of the external negative voltage input terminal VM exceeds a predetermined voltage value, the VM detector 116 outputs a pull-up signal to the control circuit 112. In response to the pull-up signal being input, the control circuit 112 turns off the switches 114, 115 to set the charge/discharge monitoring circuit 111 and the detector 113 to a power-down state.

Note that, in the case of the charger being connected to the battery device 10 and transition being made from the power-down state to the normal state, upon receipt of a pull-up release signal from the VM detector 116, the SR latch circuit D illustrated in FIG. 2 outputs a signal (L level) for releasing the latch to each of the R terminal of the SR latch circuit C and the OR gate B to turn on the discharge control FET 12. Additionally, the control circuit 112 turns on the switches 114, 115 to operate the charge/discharge monitoring circuit 111 and the detector 113, thereby transitioning to the normal state.

As described above, the charge/discharge control circuit 11 of this embodiment includes the control circuit 112 that, in response to a power-down control signal being input from the controller 14, latches the power-down control signal and blocks the discharge path from the secondary cell SC to the controller 14. As a result, even if the discharge path is blocked and a normal control signal is input due to malfunction of the controller 14 of which voltage is dropped to or below the minimum operating voltage, the charge/discharge control circuit 11 can reliably transition to the power-down state.

Although an embodiment of the present invention has been described above, it goes without saying that the present invention is not limited to the above-described embodiment and various changes and combinations can be made without departing from the spirit of the present invention.

Figure 3:
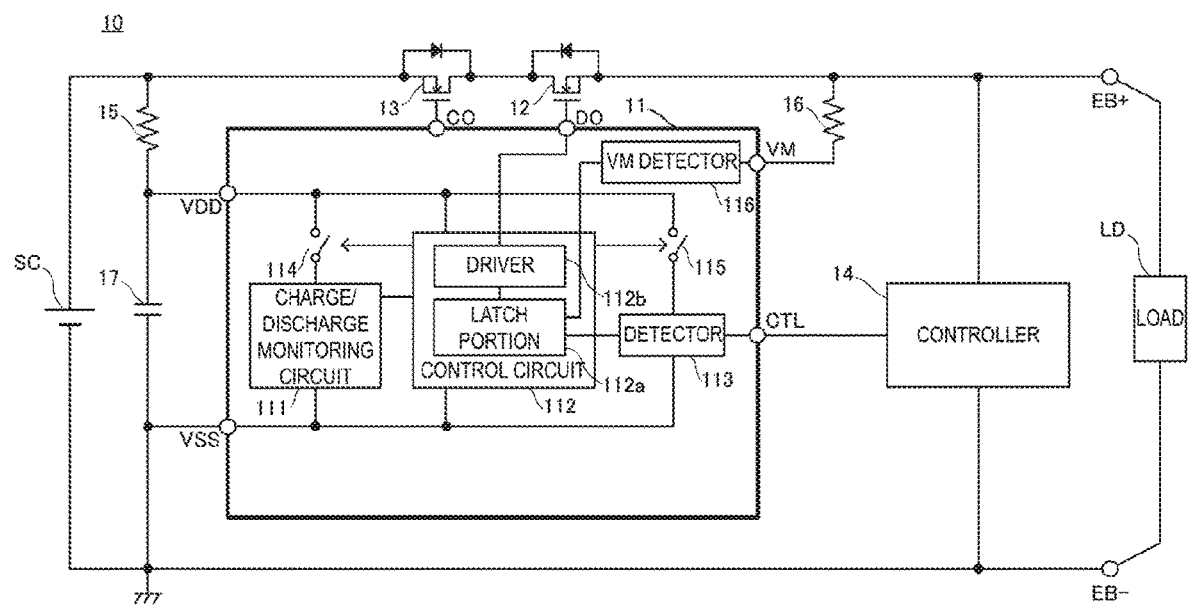
FIG. 3 is a block diagram illustrating a modification example of the battery device of the embodiment.
Figure 4:
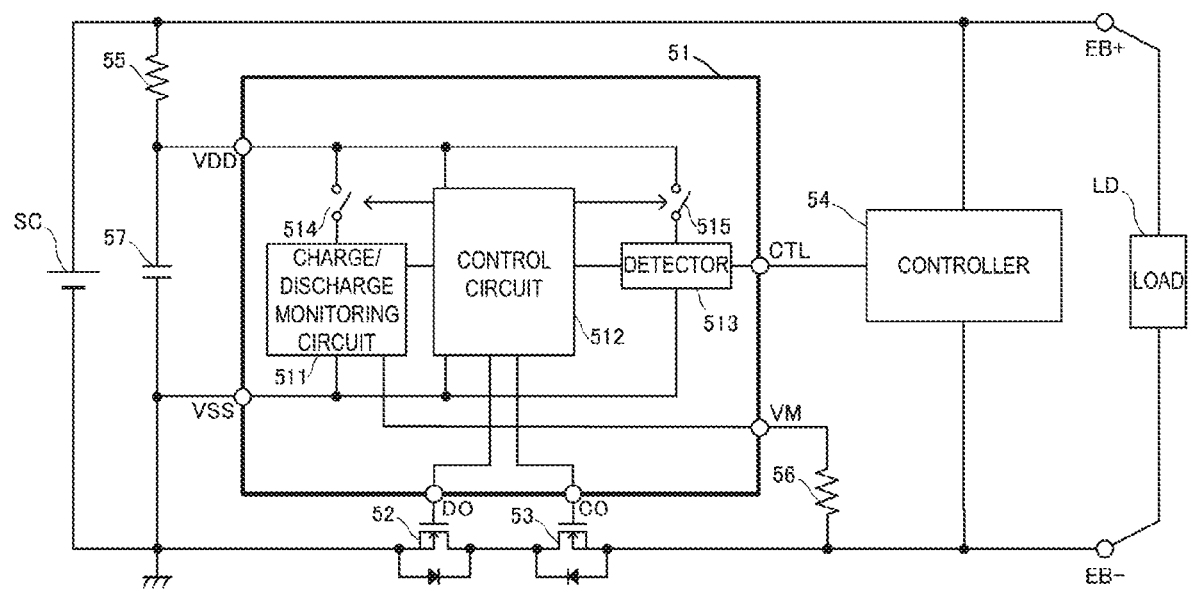
FIG. 4 is a block diagram of a battery device in the related art including a charge/discharge control circuit and a controller.

While, in this embodiment, the discharge control FET 12 and the charge control FET 13 are connected to the negative electrode side of the secondary cell SC, the discharge control FET 12 and the charge control FET 13 may be connected to the positive electrode side of the secondary cell SC, as in the modification example illustrated in FIG. 3, for example. Further, the discharge control FET 12 and the charge control FET 13 are an N-channel FET, but are not limited thereto, and may be a P-channel FET.

What is claimed is:

1. A battery device comprising:
   a secondary cell connected to a load which includes a capacity;
   a controller connected in parallel with the load to the secondary cell and configured to output a power-down control signal for transitioning to a power-down state;
   a discharge control FET configured to block or open a discharge path from the secondary cell to the load and the controller; and
   a charge/discharge control circuit connected to the secondary cell in parallel with the load and the controller,
   wherein the charge/discharge control circuit comprises:
      a control circuit configured to, in response to the power-down control signal being input from the controller, latch the power-down control signal and stop all discharge from the secondary cell to the controller by outputting a discharge inhibit signal for turning off the discharge control FET.

2. The battery device according to claim 1, wherein the control circuit is configured to output the discharge inhibit signal for turning off the discharge control FET connected between the secondary cell and the controller and block the discharge path.

3. The battery device according to claim 2, wherein the control circuit comprises:
- a latch portion configured to latch the power-down control signal input from the controller and output a latch signal corresponding to the power-down control signal being latched, and
- a driver configured to output the discharge inhibit signal in response to the latch signal being input from the latch portion.

* * * * *